(12) United States Patent
Ou et al.

(10) Patent No.: US 7,939,615 B2
(45) Date of Patent: May 10, 2011

(54) ARTICLES CONTAINING SILICONE COMPOSITIONS AND METHODS OF MAKING SUCH ARTICLES

(75) Inventors: Duan Li Ou, Northboro, MA (US); Mark W. Simon, Pascoag, RI (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 495 days.

(21) Appl. No.: 12/044,850

(22) Filed: Mar. 7, 2008

(65) Prior Publication Data

US 2008/0221232 A1 Sep. 11, 2008

Related U.S. Application Data

(60) Provisional application No. 60/893,561, filed on Mar. 7, 2007, provisional application No. 61/017,428, filed on Dec. 28, 2007.

(51) Int. Cl.
*C08G 77/20* (2006.01)

(52) U.S. Cl. .......................... 528/26; 521/154; 524/588

(58) Field of Classification Search .................... 528/26; 521/154
See application file for complete search history.

(56) References Cited

U.S. PATENT DOCUMENTS

| | | | |
|---|---|---|---|
| 3,809,590 A | 5/1974 | Fantini et al. | |
| 3,941,741 A | 3/1976 | De Zuba et al. | |
| 4,585,670 A | 4/1986 | Liu | |
| 4,600,673 A * | 7/1986 | Hendrickson et al. | 430/66 |
| 5,011,556 A | 4/1991 | Yamaguchi et al. | |
| 5,415,912 A | 5/1995 | Ushizaka et al. | |
| 5,647,400 A | 7/1997 | Jani et al. | |
| 5,679,734 A * | 10/1997 | Peccoux et al. | 524/267 |
| 5,718,957 A | 2/1998 | Yokoe et al. | |
| 5,965,074 A | 10/1999 | Aubertin et al. | |
| 6,004,310 A | 12/1999 | Bardsley et al. | |
| 6,040,366 A | 3/2000 | Burkus, II et al. | |
| 6,174,473 B1 | 1/2001 | Levy et al. | |
| 6,379,596 B1 | 4/2002 | Warburton-Pitt | |
| 6,451,396 B1 | 9/2002 | Zumbrum et al. | |
| 6,494,693 B1 | 12/2002 | Sunden | |
| 6,673,455 B2 | 1/2004 | Zumbrum et al. | |
| 6,948,528 B2 | 9/2005 | Martucci et al. | |
| 2002/0122946 A1 | 9/2002 | Kuck et al. | |
| 2003/0228473 A1 * | 12/2003 | Benayoun et al. | 428/447 |
| 2004/0222618 A1 * | 11/2004 | Azechi et al. | 280/728.1 |
| 2004/0229043 A1 | 11/2004 | Spohn et al. | |
| 2005/0042462 A1 * | 2/2005 | Fehn et al. | 428/447 |
| 2005/0212160 A1 | 9/2005 | Roberts | |
| 2006/0018777 A1 | 1/2006 | Zumbrum | |
| 2006/0182914 A1 | 8/2006 | Yasumatsu et al. | |
| 2008/0035228 A1 | 2/2008 | Bentley | |
| 2008/0090332 A1 * | 4/2008 | Cheng et al. | 438/118 |
| 2009/0202788 A1 * | 8/2009 | Fu et al. | 428/195.1 |

FOREIGN PATENT DOCUMENTS

| | | |
|---|---|---|
| DE | 3608668 A1 | 9/1987 |
| EP | 0186839 A | 7/1986 |
| EP | 0420585 A | 4/1991 |
| EP | 1396670 A1 | 3/2004 |
| GB | 2362600 A | 11/2001 |
| WO | 2006134400 A | 12/2006 |
| WO | 2008109863 A2 | 9/2008 |
| WO | 2008109865 A2 | 9/2008 |
| WO | 2007045692 A | 10/2008 |

OTHER PUBLICATIONS

Technical Search 2, 7 pgs, 2006.
List of Related Applications, 1 page.
Technical Search, 7 pgs, 2006.

* cited by examiner

*Primary Examiner* — Ling-Siu Choi
*Assistant Examiner* — Chun-Cheng Wang
(74) *Attorney, Agent, or Firm* — Larson Newman & Abel, LLP; Robert T. Conway (57) ABSTRACT

The disclosure is directed to a method of making a silicone composition includes mixing a silicone formulation in a mixing device and adding an in situ adhesion promoter to the mixing device. The disclosure is further directed to articles made from the above-mentioned silicone composition.

20 Claims, 2 Drawing Sheets

ARTICLES CONTAINING SILICONE COMPOSITIONS AND METHODS OF MAKING SUCH ARTICLES

CROSS-REFERENCE TO RELATED APPLICATIONS

The present application claims priority from U.S. Provisional Patent Application No. 60/893,561, filed Mar. 7, 2007, entitled "ARTICLES CONTAINING SILICONE COMPOSITIONS AND METHODS OF MAKING SUCH ARTICLES," naming inventors Duan Li Ou and Mark W. Simon, and U.S. Provisional Patent Application No. 61/017,428, filed Dec. 28, 2007, entitled "ARTICLES CONTAINING SILICONE COMPOSITIONS AND METHODS OF MAKING SUCH ARTICLES," naming inventors Duan Li Ou and Mark W. Simon, of which both applications are incorporated by reference herein in their entirety.

FIELD OF THE DISCLOSURE

This disclosure, in general, relates to a method for making a silicone composition and articles including the silicone composition.

BACKGROUND

Curable silicone compositions are used in a variety of applications that ranges from the automotive industry to medical devices. Typical commercial formulations of liquid silicone rubber (LSR) compositions include a multi-component mixture of a vinyl-containing polydiorganosiloxane, a hydrogen-containing polydiorganosiloxane, catalyst, and filler. Often, the commercial formulation is a two-part formulation that is mixed together prior to use. Once the commercial formulation is mixed, the silicone composition is subsequently molded or extruded and vulcanized.

In many cases, the silicone composition is coupled to a variety of substrates such as polymeric, metallic, or glass substrates. For instance, silicone compositions are used as a coating or a laminate over a variety of polymeric substrates. Typically, a primer is used between the silicone composition and the substrate. Alternatively, the backbone of the silicone composition may be formulated to provide the silicone composition with adhesive properties to various substrates, such that a primer is optional. Often, such silicone compositions are referred to as self-bonding silicone compositions.

While self-bonding silicone compositions desirably improve bonding to particular substrates, such compositions are generally orders of magnitude more expensive than other silicone formulations. In addition, manufactures of products that use such self-bonding silicone compositions are limited in their ability to customize such formulations to better suit a particular product or process. As a result, manufacturers are often left to choose between desired bonding properties or desired mechanical properties, without an option to acquire both.

As such, an improved silicone formulations and method of manufacturing silicone-including articles would be desirable.

SUMMARY

In a particular embodiment, a method of making a silicone composition includes mixing a silicone formulation in a mixing device and adding an in situ adhesion promoter to the mixing device.

In another embodiment, an article includes silicone formulation comprising a polyalkylsiloxane and an in situ adhesion promoter. The in situ adhesion promoter includes a $C_{1-8}$ alkyl ester of maleic acid, fumaric acid, or any combination thereof and optionally, an organosilsesquioxane.

In another exemplary embodiment, an article includes a first layer comprising a polymeric material, a glass, or a metal and a second layer adjacent the first layer. The second layer includes a silicone formulation and an in situ adhesion promoter. The in situ adhesion promoter is a $C_{1-8}$ alkyl ester of maleic acid, fumaric acid, or any combination thereof and optionally, an organosilsesquioxane.

In another exemplary embodiment, an article includes a silicone composition comprising a polyalkylsiloxane and a vinyl-containing silsesquioxane. The vinyl-containing silsesquioxane contains $RSiO_{3/2}$ units wherein R is an alkyl group, an alkoxy group, a phenyl group, or any combination thereof.

In a further exemplary embodiment, an article includes a first layer comprising a polymeric material, a glass, or a metal and a second layer adjacent the first layer. The second layer includes a silicone formulation and a vinyl-containing silsesquioxane containing $RSiO_{3/2}$ units wherein R is an alkyl group, an alkoxy group, a phenyl group, or combination thereof.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

In a particular embodiment, a silicone composition includes a silicone formulation and an in situ adhesion promoter, such as a silsesquioxane. The incorporation of the in situ adhesion promoter into the silicone formulation provides a silicone composition that adheres to substrates with desirable peel strength. In particular, desirable adhesion may be achieved without a primer. The silicone composition is typically prepared by homogeneously mixing the in situ adhesion promoter with the silicone formulation using any suitable mixing method. "In situ" as used herein refers to mixing the adhesion promoter and the silicone formulation prior to vulcanization of the silicone rubber.

In an exemplary embodiment, the silicone formulation may include a non-polar silicone polymer. The silicone polymer may, for example, include polyalkylsiloxanes, such as silicone polymers formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS). In a particular embodiment, the polyalkylsiloxane is a silicone hydride-containing polydimethylsiloxane. In a further embodiment, the polyalkylsiloxane is a vinyl-containing polydimethylsiloxane. In yet another embodiment, the silicone polymer is a combination of a hydride-containing polydimethylsiloxane and a vinyl-containing polydimethylsiloxane. In an example, the silicone polymer is non-polar and is free of halide functional groups, such as chlorine and fluorine, and of phenyl functional groups. Alternatively, the silicone polymer may include halide functional groups or phenyl functional groups. For example, the silicone polymer may include fluorosilicone or phenylsilicone.

Typically, the silicone polymer is elastomeric. For example, the durometer (Shore A) of the silicone polymer may be less than about 75, such as about 1 to 70, about 20 to about 50, about 30 to about 50, about 40 to about 50, or about 1 to about 5. In particular, the silicone compositions including the in situ adhesion promoter and the process for formulating such a composition may advantageously produce low durometer silicone elastomers having desirable mechanical properties. For example, a silicone elastomer having a Shore A durometer not greater than 30, such as not greater than 25, and having desirable mechanical properties may be formed.

The silicone formulation may further include a catalyst and other optional additives. Exemplary additives may include, individually or in combination, fillers, inhibitors, colorants, and pigments. In an embodiment, the silicone formulation is a platinum catalyzed silicone formulation. Alternatively, the silicone formulation may be a peroxide catalyzed silicone formulation. In another example, the silicone formulation may be a combination of a platinum catalyzed and peroxide catalyzed silicone formulation. The silicone formulation may be a room temperature vulcanizable (RTV) formulation or a gel. In an embodiment, the silicone formulation may be a liquid silicone rubber (LSR) or a high consistency gum rubber (HCR). In an embodiment, the silicone formulation may include silicone foams, for example, an HCR silicone foam, such as platinum cured HCR silicone foam. In a particular embodiment, the silicone formulation is a platinum catalyzed LSR. In a further embodiment, the silicone formulation is an LSR formed from a two-part reactive system.

The silicone formulation may be a conventional, commercially prepared silicone polymer. The commercially prepared silicone polymer typically includes the non-polar silicone polymer, a catalyst, a filler, and optional additives. "Conventional" as used herein refers to a commercially prepared silicone polymer that is free of any self-bonding moiety or additive. Particular embodiments of conventional, commercially prepared LSR include Wacker Elastosil® LR 3003/50 by Wacker Silicone of Adrian, Mich. and Rhodia Silbione® LSR 4340 by Rhodia Silicones of Ventura, Calif. In another example, the silicone polymer is an HCR, such as Wacker Elastosil® R4000/50 available from Wacker Silicone.

In an exemplary embodiment, a conventional, commercially prepared silicone polymer is available as a two-part reactive system. Part 1 typically includes a vinyl-containing polydialkylsiloxane, a filler, and catalyst. Part 2 typically includes a hydride-containing polydialkylsiloxane and optionally, a vinyl-containing polydialkylsiloxane and other additives. A reaction inhibitor may be included in Part 1 or Part 2. Mixing Part 1 and Part 2 by any suitable mixing method produces the silicone formulation. In an embodiment, the in situ adhesion promoter, such as silsesquioxane, is added to the mixed two-part system or during the process of mixing the two-part system. As stated earlier, the in situ adhesion promoter is added to the conventional, commercially prepared silicone polymer prior to vulcanization. In an exemplary embodiment, the two-part system and the in situ adhesion promoter are mixed in a mixing device. In an example, the mixing device is a mixer in an injection molder. In another example, the mixing device is a mixer, such as a dough mixer, Ross mixer, two-roll mill, or Brabender mixer. In contrast to adding the in situ adhesion promoter during or after mixing and prior to vulcanization, typical self-bonding silicone compositions that are commercially available incorporate an additive during an earlier stage of preparing the silicone rubber. Typically, the additive is incorporated into the precursor while preparing the polyalkylsiloxane, and often, modifies the polyalkylsiloxane chain.

In an embodiment, the in situ adhesion promoter may include vinyl siloxane or silsesquioxane. In an example, the silsesquioxane includes an organosilsesquioxane or a vinyl-containing silsesquioxane. For example, the vinyl-containing silsesquioxane may include $RSiO_{3/2}$ units, wherein R is a vinyl group, an alkyl group, an alkoxy group, a phenyl group, or any combination thereof. Typically, the silsesquioxane has a vinyl content of at least about 30.0% by weight. In an embodiment, the alkyl or alkoxy group includes a $C_{1-6}$ hydrocarbon group, such as a methyl, ethyl, or propyl group. The in situ adhesion promoter may include $R_2SiO_{2/2}$ units, $R_3SiO_{1/2}$ units and $SiO_{4/2}$ units, wherein R is an alkyl radical, alkoxy radical, phenyl radical, or any combination thereof. In an embodiment, the vinyl-containing silsesquioxane may include pre-hydrolyzed silsesquioxane prepolymers, monomers, or oligomers.

In addition, the silsesquioxane may have desirable processing properties, such as viscosity. In particular, the viscosity may provide for improved processing in situ, such as during silicone formulation mixing or extrusion. For example, the viscosity of the silsesquioxane may be about 1.0 centistokes (cSt) to about 8.0 cSt, such as about 2.0 cSt to about 4.0 cSt, or about 3.0 cSt to about 7.0 cSt. In an example, the viscosity of the silsesquioxane may be up to about 100.0 cSt, or even greater than about 100.0 cSt.

Typically, the addition of the vinyl-containing silsesquioxane in situ adhesion promoter to the silicone composition is detectable using nuclear magnetic resonance (NMR). The $^{29}Si$ NMR spectra of the silicone formulation has two groups of distinguished peaks at about −65 ppm to about −67 ppm and about −72 ppm to about −75 ppm, which corresponds to $ViSiO_{2/2}$ (OH) units and $ViSiO_{3/2}$ units, respectively.

In an embodiment, the in situ adhesion promoter may include an ester of unsaturated aliphatic carboxylic acids. Exemplary esters of unsaturated aliphatic carboxylic acids include $C_{1-8}$ alkyl esters of maleic acid and $C_{1-8}$ alkyl esters of fumaric acid. In an embodiment, the alkyl group is methyl or ethyl. In an example, the maleic acid is an ester having the general formula:

wherein R' is a $C_{1-8}$ alkyl group. In an embodiment, R' is methyl or ethyl. In a particular embodiment, the in situ adhesion promoter is dimethyl maleate, diethyl maleate, or any combination thereof.

In an embodiment, one or more of the above-mentioned in situ adhesion promoters may be added to the silicone formulation. For instance, the in situ adhesion promoter may include a mixture of the silsesquioxane and the ester of unsaturated aliphatic carboxylic acid. In an embodiment, the silsesquioxane is an organosilsesquioxane wherein the organo group is a $C_{1-18}$ alkyl. In an embodiment, the in situ adhesion promoter is a mixture of the organosilsesquioxane and diethyl maleate. In another embodiment, the in situ adhesion promoter is a mixture of the organosilsesquioxane and dimethyl maleate. In a particular embodiment, the mixture of the organosilsesquioxane and the ester of unsaturate aliphatic carboxylic acid is a weight ratio of about 1.5:1.0 to about 1.0:1.0.

Generally, the in situ adhesion promoter is present in an effective amount to provide an adhesive formulation which bonds to substrates. In an embodiment, an "effective amount"

is about 0.1 weight % to about 5.0 weight %, such as about 0.1 wt % to about 3.0 wt %, such as about 1.0 wt % to about 3.0 wt %, or about 0.2 wt % to about 1.0 wt % of the total weight of the silicone polymer.

The silicone composition containing the in situ adhesion promoter may exhibit improved adhesion to substrates. Typical substrates include polymeric materials such as thermoplastics and thermosets. An exemplary polymeric material may include polyamide, polyaramide, polyimide, polyolefin, polyvinylchloride, acrylic polymer, diene monomer polymer, polycarbonate (PC), polyetheretherketone (PEEK), polyetherimide (Ultem), polyphenylsulfone (Radel), fluoropolymer, polyester, polypropylene, polystyrene, polyurethane, thermoplastic blends, or any combination thereof. Further polymeric materials may include silicones, phenolics, epoxys, glass-filled nylon, or any combination thereof. In a particular embodiment, the substrate includes PC, PEEK, fluoropolymer, or any combination thereof. The silicone composition and the substrate can be used to form any useful article. To form a useful article, the polymeric substrate may be processed. Processing of the polymeric substrate, particularly the thermoplastic substrates, may include casting, extruding or skiving.

In an example, the substrate is a fluoropolymer. An exemplary fluoropolymer may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. For example, the fluoropolymer is polytetrafluoroethylene (PTFE). In an embodiment, the polytetrafluoroethylene (PTFE) may be paste extruded, skived, expanded, biaxially stretched, or an oriented polymeric film.

In an exemplary embodiment, the fluoropolymer is a heat-shrinkable polytetrafluoroethylene (PTFE). The heat-shrinkable PTFE of the disclosure has a stretch ratio not greater than about 4:1, such between about 1.5:1 and about 2.5:1. In an exemplary embodiment, the heat-shrinkable PTFE is not stretched to a node and fibrile structure. In contrast, expanded PTFE is generally biaxially expanded at ratios of about 4:1 to form node and fibrile structures. Hence, the heat-shrinkable PTFE of the disclosure maintains chemical resistance as well as achieves flexibility.

Further exemplary fluoropolymers include a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. For example, the fluoropolymer may include FEP. In a further example, the fluoropolymer may include PVDF. In an exemplary embodiment, the fluoropolymer may be a polymer crosslinkable through radiation, such as e-beam. An exemplary crosslinkable fluoropolymer may include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers used herein may be obtained from Daikin (Japan) and DuPont (USA). In particular, FEP fluoropolymers are commercially available from Daikin, such as NP-12X.

Other substrates include glass and metals. An exemplary glass may include boroaluminosilicate, silicate, aluminosilicate, or any combination thereof. An exemplary metal may include stainless steel, steel, titanium, aluminum, copper, or any combination thereof.

In general, the silicone formulation including the in situ adhesion promoter exhibits desirable adhesion to a substrate without further treatment of the substrate surface. Alternatively, the substrate may be treated to further enhance adhesion. In an embodiment, the adhesion between the substrate and the silicone composition may be improved through the use of a variety of commercially available surface treatment of the substrate. An exemplary surface treatment may include chemical etch, physical-mechanical etch, plasma etch, corona treatment, chemical vapor deposition, or any combination thereof. In an embodiment, the chemical etch includes sodium ammonia and sodium naphthalene. An exemplary physical-mechanical etch may include sandblasting and air abrasion. In another embodiment, plasma etching includes reactive plasmas such as hydrogen, oxygen, acetylene, methane, and mixtures thereof with nitrogen, argon, and helium. Corona treatment may include the reactive hydrocarbon vapors such as acetone. In an embodiment, the chemical vapor deposition includes the use of acrylates, vinylidene chloride, and acetone. Once the article is formed, the article may be subjected to a post-cure treatment, such as a thermal treatment or radiative curing. Thermal treatment typically occurs at a temperature of about 125° C. to about 200° C. In an embodiment, the thermal treatment is at a temperature of about 150° C. to about 180° C. Typically, the thermal treatment occurs for a time period of about 5 minutes to about 10 hours, such as about 10 minutes to about 30 minutes, or alternatively about 1 hour to about 4 hours.

In an embodiment, radiation crosslinking or radiative curing may be performed once the article is formed. The radiation may be effective to crosslink the silicone composition. The intralayer crosslinking of polymer molecules within the silicone composition provides a cured composition and imparts structural strength to the silicone composition of the article. In addition, radiation may effect a bond between the silicone composition and the substrate, such as through interlayer crosslinking. In a particular embodiment, the combination of interlayer crosslinking bonds between the substrate and the silicone composition present an integrated composite that is highly resistant to delamination, has a high quality of adhesion resistant and protective surface, incorporates a minimum amount of adhesion resistant material, and yet, is physically substantial for convenient handling and deployment of the article. In a particular embodiment, the radiation may be ultraviolet electromagnetic radiation having a wavelength between 170 nm and 400 nm, such as about 170 nm to about 220 nm. In an example, crosslinking may be effected using at least about 120 J/cm$^2$ radiation.

In an exemplary embodiment, the silicone composition advantageously exhibits desirable peel strength when applied to a substrate. In particular, the peel strength may be significantly high or the layered structure may exhibit cohesive failure during testing. "Cohesive failure" as used herein indicates that the silicone composition or the substrate ruptures before the bond between the silicone composition and the substrate fails. In an embodiment, the article has a peel strength of at least about 0.9 pounds per inch (ppi), or even enough to lead to cohesive failure, when tested in standard "180°"-Peel configuration at room temperature prior to any post-cure, or may have a peel strength of at least about 10.0 ppi after post-cure treatment when adhered to a polymeric substrate. For example, before post-cure treatment, the silicone composition may exhibit a peel strength of at least about 0.6 ppi, such as at least about 1.2 ppi, such as at least about 4.0 ppi, such as at least about 10.0 ppi, such as at least about 14.0 ppi, or even at least about 20.0 ppi when adhered to polycarbonate. After treatment, the silicone composition may exhibit a peel strength of at least about 10.0 ppi, such as at least about 16.0 ppi, such as at least about 20.0 ppi, such as at least about 29.0 ppi, such as at least about 35.0 ppi, such as at least about 50.0 ppi, or even cohesively fail during the test when adhered to polycarbonate. In another example, the peel strength of the article may be at least about 1.6 ppi, such as at least about 2.0 ppi, such as at least about 5.0 ppi, such as at least about 7.0 ppi, such as at least about 11.0 ppi, such as at least about 13.0 ppi, such as at least about 20.0 ppi, or even enough to lead to cohesively fail during testing when the substrate is polyetheretherketone and prior to any post-cure. When the substrate is polyetheretherketone, the article may have a peel strength of at least about 2.9 ppi, such as at least about 8.0 ppi, such as at least about 12.0 ppi, such as at least about 20.0 ppi, such as at least about 25.0 ppi, such as at least about 55.0 ppi, such as at least about 64.0 ppi, or even enough to lead to cohesively fail during testing after post-cure treatment. When the substrate is polyester, the article may have a peel strength of at least about 0.8 ppi, such as at least about 2.6 ppi, such as at least about 9.0 ppi, such as at least about 15.0 ppi, such as about 22.0 ppi or even cohesively fail prior to any post-cure. After treatment, the silicone composition may exhibit a peel strength of at least about 50.0 ppi, such as at least about 65.0 ppi, such as at least about 80.0 ppi, or even cohesively fail during the test when adhered to polyester. When the substrate is polyetherimide, the article may have a peel strength of at least about 1.8 ppi, such as at least about 3.0, such as at least about 8.5 ppi, such as at least about 20.0 ppi, or even cohesively fail prior to any post-cure. After treatment, the silicone composition may exhibit a peel strength of at least about 17.0 ppi, such as at least about 40.0 ppi, such as at least about 63.5 ppi, or even cohesively fail when adhered to polyetherimide. When the substrate is polyphenylsulfone, the article may have a peel strength of at least about 3.2 ppi, such as at least about 26.0 ppi, or even cohesively fail prior to any post-cure. After treatment, the silicone composition may exhibit a peel strength of at least about 51.0 ppi, such as at least about 75.0 ppi, or even cohesively fail when adhered to polyphenylsulfone.

In addition to desirable peel strength, the silicone compositions have advantageous physical properties, such as improved elongation-at-break, tensile strength, or tear strength. Elongation-at-break and tensile strength are determined using an Instron instrument in accordance with ASTM D-412 testing methods. For example, the silicone composition may exhibit an elongation-at-break of at least about 350%, such as at least about 500%, at least about 550%, at least about 600%, at least about 650%, or even at least about 700%. In an embodiment, the tensile strength of the silicone composition is greater than about 400 psi, and in particular, is at least about 1100 psi, such as at least about 1200 psi, such as at least about 1250 psi, or even at least about 1500 psi. Particular embodiments exhibit a desirable combination of elongation and tensile strength, such as exhibiting a tensile strength of at least about 800 psi and an elongation of at least about 500%. Further, the silicone composition may have a tear strength greater than about 100 ppi, such as at least about 150 ppi, such as at least about 225 ppi, such as at least about 250 ppi, or even at least about 300 ppi.

The silicone formulation can be used to form articles such as monolayer articles, multilayer articles, or can be laminated, coated, or formed on a substrate. In an example, the silicone formulation may be used to form a multilayer film or tape. The silicone formulation may be used as a film or tape to provide a barrier layer or a chemical resistant layer. Alternatively, the silicone formulation may be used to form an irregularly shaped article. Further, the silicone formulation may be used to form fabrics, reinforcements, or foams. Fabrics and reinforcement articles may include glass mats, fiberglass, and polymeric braids such as polyamide or polyester braids.

In an embodiment, the article includes a silicone formulation of liquid silicone rubber (LSR) or high consistency rubber (HCR). The article may include processing of the liquid silicone rubber or high consistency gum rubber. For example, processing of the liquid silicone rubber may include any suitable method such as compression molding, overmolding, liquid injection molding, co-processing of the LSR with a thermoplastic material, coating, or processing as a thin film. In another example, processing of the high consistency rubber may include any suitable method such as extrusion, jacketing, braiding, processing as a film, compression molding, and overmolding.

Applications for the silicone formulations are numerous. The silicone formulation may be used as laminates, tie layers, insulators, medical devices, silicone adhesives, coated fabrics, and tubing and hoses. For instance, the silicone formulation may be used as a laminate to produce articles such as, for example, multilayer films, barrier and chemical resistant films, analytical septa, and bearings. An exemplary multilayer film includes a PTFE layer, a silicone formulation layer, and a metal layer. Another exemplary multilayer film includes a PTFE layer, a silicone formulation layer, and a thermoplastic layer.

The silicone formulation may be used as an insulator. The silicone formulation may be used to produce articles such as, for example, wires and cables, electrical and thermal insulators, insulators for high temperature applications, and insulators to control heat transfer. In an example, the silicone formulation is used with a metal as the substrate.

Further, the silicone formulation may be used in medical devices. The silicone formulation may be used to produce articles such as two-component medical devices. Exemplary medical devices include surgical tools or any suitable application for operator comfort. In an example, the medical device may include a thermoplastic and the silicone formulation. In another example, the medical device may include a metal and the silicone formulation.

In another example, the silicone formulation may be used as a silicone adhesive. Particularly, the silicone formulation may be used as a bonding agent for cured silicone rubber. In an example, the silicone formulation may be used to bond a silicone to another silicone. In another example, the silicone formulation may be used to bond another material to a silicone, such as a tie layer to bond a thermoplastic to a silicone. The silicone formulation may also be used to bond surface modified fluoropolymer to metal, such as sodium naphthalene etched PTFE to steel.

The silicone formulation may be used for coated fabrics. The silicone formulation may be used to produce coated articles such as temperature resist articles, non-stick bakeware, heat-resistant gloves, or protective coatings for glass. In an example, the silicone formulation is used to coat fiberglass.

In yet another embodiment, the silicone formulation may be used to produce tubing and hoses. The silicone formulation can be used as tubing or hosing to produce chemically resistant pump tubing, reinforced hosing, chemically resistant hosing, braided hosing, and low permeability hosing and tubing. In a particular embodiment, the article may be a monolayer tube or multilayer tube. For example, the multilayer tube may include a liner and a cover. The liner may include a low surface energy polymer, for example, a fluoropolymer. The cover may include the silicone composition and directly contacts the liner. In an exemplary embodiment, the multi-layer tube also may include an intermediate layer sandwiched between the liner and the cover. The intermediate layer may include, for example, an adhesive layer.

Figure 1:
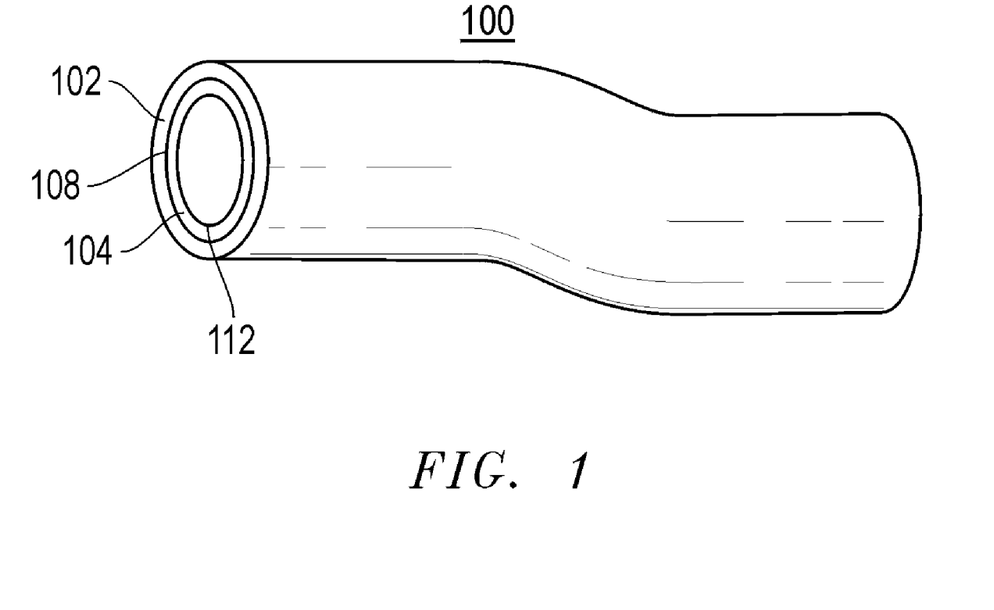
FIGS. 1 and 2 include illustrations of exemplary tubes.

As illustrated in FIG. 1, the silicone formulation is used to produce a multi-layer tube 100. The multi-layer tube 100 is an elongated annular structure with a hollow central bore. The multi-layer tube 100 includes a cover 102 and a liner 104. The cover 102 is directly in contact with and may be directly bonded to a liner 104 along an outer surface 108 of the liner 104. For example, the cover 102 may directly bond to the liner 104 without intervening adhesive layers. In an exemplary embodiment, the multi-layer tube 100 includes two layers, such as the cover 102 and the liner 104. In an exemplary embodiment, the liner 104 is a fluoropolymer.

Figure 2:
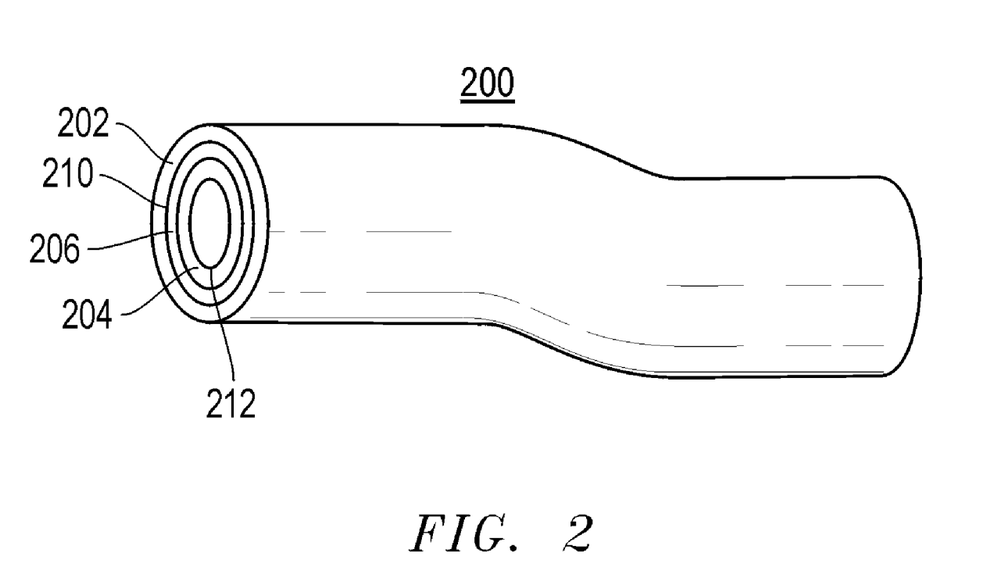

Alternatively, a multi-layer tube 200 may include two or more layers, such as three layers. For example, FIG. 2 illustrates a third layer 206 sandwiched between liner 204 and cover 202. In an exemplary embodiment, third layer 206 is directly in contact with and may be directly bonded to the outer surface 208 of the liner 204. In such an example, the third layer 206 may directly contact and may be bonded to cover 202 along an outer surface 210 of third layer 206. In an embodiment, the third layer 206 may be an adhesive layer.

Returning to FIG. 1, the multi-layer tube 100 may be formed through a method wherein the elastomeric cover 102 is extruded over the liner 104. The liner 104 includes an inner surface 112 that defines a central lumen of the tube. In an exemplary embodiment, the liner 104 may be a paste-extruded fluoropolymer. Paste extrusion is a process that includes extruding a paste of a lubricant and a PTFE powder. Typically, the PTFE powder is a fine powder fibrillated by application of shearing forces. This paste is extruded at low temperature (not exceeding 75° C.). In an embodiment, the paste is extruded in the form of a tube. Once the paste is extruded, the PTFE may be stretched to a ratio of less than about 4:1 to form heat shrinkable PTFE. In an embodiment, the multi-layer tube 100 may be produced without the use of a mandrel during the laminating process, and the heat-shrink PTFE liner is produced without mandrel wrapping.

Prior to extrusion of the cover 102, adhesion between the liner 104 and the cover 102 may be improved through the use of a surface treatment of the outer surface 108 of the liner 104. In an embodiment, radiation crosslinking may be performed once the multi-layer tube 100 is formed.

In general, the cover 102 has greater thickness than the liner 104. The total tube thickness of the multi-layer tube 100 may be at least about 3 mils to about 50 mils, such as about 3 mils to about 20 mils, or about 3 mils to about 10 mils. In an embodiment, the liner 104 has a thickness of about 1 mil to about 20 mils, such as about 3 mils to about 10 mils, or about 1 mil to about 2 mils.

Once formed and cured, particular embodiments of the above-disclosed multi-layer tube advantageously exhibit desired properties such as increased lifetime and flow stability. For example, the multi-layer tube may have a pump life of greater than about 250 hours, such as greater than about 350 hours. In an embodiment, a multi-layer tube including a liner formed of a heat-shrinkable fluoropolymer is particularly advantageous, providing improved lifetime. In a further embodiment, a liner formed of a sodium-napthalene etched heat-shrinkable fluoropolymer is particularly advantageous, reducing delamination of the liner and the coating.

In an exemplary embodiment, the multi-layer tube may have less than about 30% loss in the delivery rate when tested for flow stability. In particular, the loss in the delivery rate may be less than about 60%, such as less than about 40%, or such as less than about 30%, when tested at 600 rpm on a standard pump head.

EXAMPLE 1

Five formulations are prepared for a performance study. Specifically, three vinyl-containing silsesquioxanes are added to two commercial LSR formulations. The vinyl-containing silsesquioxanes are commercially available from Gelest. Technical data of the vinyl-containing silsesquioxanes is illustrated in Table 1. The silicon LSRs are Wacker product 3003/50 and Rhodia product 4340. Formulation data is illustrated in Table 2. The low viscosity vinyl-containing silsesquioxanes are incorporated easily into the LSRs during the two part mixing step, using a dough mixer. The additive loading level was between 0.5 to 2% by weight of LSR (phr, part per hundred part of rubber).

TABLE 1

Properties of Silsesquioxane In-Situ Adhesion Promoter

| | Alkoxy group | Density (g/cm$^3$) | Viscosity (cSt) |
|---|---|---|---|
| VEE-005 | Ethoxy | 1.02 | 4-7 |
| VMM-010 | Methoxy | 1.10 | 8-12 |
| VPE-005 | Ethoxy | 1.02 | 3-7 |

TABLE 2

Example Formulations

| | Matrix | Additive | % of additive (phr) |
|---|---|---|---|
| Formulation 1 | Wacker 3003/50 | VEE-005 | 0.75 |
| Formulation 2 | Wacker 3003/50 | VMM-010 | 0.75 |
| Formulation 3 | Rhodia 4340 | VEE-005 | 0.75 |
| Formulation 4 | Wacker 3003/40 | VPE-005 | 1.5 |
| Formulation 5 | Wacker 3003/50 | VPE-005 | 1.5 |

The mechanical properties of the five formulations are evaluated. The test slabs are compression molded at 177° C. for 5 minutes and post-cured at 177° C. for 4 hours. Tensile properties, such as tensile strength and elongation-at-break, are evaluated on an Instron using ASTM D-412. Tear tests are performed on an Instron according to ASTM D-624 and hardness measurements are carried out on a Shore A durometer, following the procedure of ASTM D-2240. Compression set measurements are carried out according to ASTM D-395. The results are summarized in Table 3.

TABLE 3

Properties of Silicone Formulations

|  | Tensile strength (psi) | Elongation (%) | 200% modulus (psi) | Tear strength (ppi) | Durometer (shore A) | Comp. Set (%) |
|---|---|---|---|---|---|---|
| Formulation 1 | 1212 | 850 | 255 | 251 | 39 | 37 |
| Formulation 2 | 210 | 355 | 128 | 32 | 23 | 40 |
| Formulation 3 | 251 | 509 | 115 | 34 | 18 | 69 |
| Formulation 4 | 402 | 674 | 113 | 63 | 23 | 44 |
| Formulation 5 | 1104 | 696 | 288 | 226 | 40 | 19 |

EXAMPLE 2

The adhesion properties of Formulations 1 to 5 on thermal plastic substrates are evaluated. The thermal plastic substrates include the following: two commercial polycarbonate substrates, GE Lexan and Bayer Sheffield, a polyetheretherketone (PEEK) substrate, a polyester substrate, and a polyetherimide substrate (GE Ultem). Self-bonding films having a thickness of about 0.5 mm to about 1.5 mm are compression molded onto the substrates and the molding conditions are identical to physical test slabs described in Example 1. A mylar film is also molded onto the back of the silicone rubber in the same step to prevent elongation during the peel test. The peel test uses an Instron 4465 testing machine. Both silicone layer and the substrate are clamped into the Instron grip. The grip then transverses in the vertical direction at the rate of two in/min, which pulls the silicone 180° away from the substrate. The 180° peel test results are summarized in Tables 4 and 5. Table 4 illustrates the peel strength prior to treatment, and Table 5 includes peel strength after post cure at 177° C. for 4 hours. Comparison data for base rubber Wacker 3003/50 on selected substrates is also included.

TABLE 4

Peel Strength Prior to Treatment

| Peel strength (ppi) | Polycarbonate | | PEEK | Polyester | Ultem |
|---|---|---|---|---|---|
| | Lexan | Sheffield | | | |
| 3003/50 | 0.2 | 0.1 | 0.4 | 0.4 | 0.1 |
| Formulation 1 | 27.3 | 4.3 | 11.6 | 22.3 | 8.5 |
| Formulation 2 | C.F. | C.F. | C.F. | C.F. | / |
| Formulation 3 | C.F. | C.F. | C.F. | C.F. | / |
| Formulation 4 | C.F. | 0.9 | 7.4 | C.F. | / |
| Formulation 5 | 34.7 | 3.8 | 3.9 | 48.1 | / |

TABLE 5

Peel Strength after Post-Cure Treatment

| Peel strength (ppi) | Polycarbonate | | PEEK | Polyester | Ultem |
|---|---|---|---|---|---|
| | Lexan | Sheffield | | | |
| 3003/50 | 1.4 | 1.7 | 1.2 | 1.1 | 0.9 |
| Formulation 1 | 57.7 | 24.4 | 68.5 | 76.4 | 17.7 |
| Formulation 2 | C.F. | C.F. | C.F. | C.F. | / |
| Formulation 3 | C.F. | C.F. | C.F. | C.F. | / |
| Formulation 4 | C.F. | C.F. | 8.2 | C.F. | / |
| Formulation 5 | 92.9 | 40.6 | 30.4 | 65.5 | / |

Before and after post-cure treatment, Formulations 1-5 bond with greater peel strength than Wacker 3003/50 on all five substrates. In particular, cohesive failure is observed in Formulations 2, 3, and 4. Hence, the adhesion force is greater than the strength of the silicone rubber. Typically, the peel strength is greater than 20 ppi when cohesive failure occurs.

EXAMPLE 3

The adhesion properties of Formulations 1 and 5 on thermal set polymers are evaluated. The thermal set polymeric substrates include the following: extrusion grade HCR rubber (Wacker 4105/40), acrylics (Plexi glass) and phenolic resin (Garolite). Self-bonding LSR films having a thickness of about 0.5 mm to about 1.5 mm are compression molded onto the substrates and the molding conditions are identical to physical test slabs described in Example 1. The peel test results are summarized in Tables 6 and 7. Table 6 illustrates the peel strength prior to treatment, and Table 7 includes peel strength after post cure at 177° C. for 4 hours.

TABLE 6

Peel Strength Prior to Treatment

| Peel strength (ppi) | HCR rubber | Phenolic resin | Acrylics |
|---|---|---|---|
| Formulation 1 | C.F. | C.F. | CF |
| Formulation 5 | C.F. | C.F. | / |

TABLE 7

Peel Strength after Post-Cure Treatment

| Peel strength (ppi) | HCR rubber | Phenolic resin | Acrylics |
|---|---|---|---|
| Formulation 1 | C.F. | C.F. | 0.3 |
| Formulation 5 | C.F. | C.F. | / |

Formulation 1 exhibits cohesive failure prior to post-cure treatment on all three substrates. Formulation 5 exhibits cohesive failure prior to post-cure treatment on both HCR rubber and phenolic resin. Cohesive failure occurs when the adhesion force is greater than the strength of the silicone rubber. Typically, the peel strength is greater than 20 ppi when cohesive failure occurs.

Post-cure, both Formulations 1 and 5 exhibit cohesive failure on HCR rubber and phenolic resin.

EXAMPLE 4

The adhesion properties of Formulations 1 and 5 on glass are evaluated. The glass substrate is borosilicate. Self-bonding LSR films having a thickness of about 0.5 mm to about 1.5 mm are compression molded onto the substrates and the molding conditions are identical to physical test slabs described in Example 1. The peel test results are summarized in Tables 8 and 9. Table 8 illustrates the peel strength prior to treatment, and Table 9 includes peel strength after post cure at 177° C. for 4 hours.

TABLE 8

Peel Strength Prior to Treatment

| Peel strength (ppi) | Borosilicate glass |
|---|---|
| Formulation 1 | C.F. |
| Formulation 5 | C.F. |

TABLE 9

Peel Strength after Post-Cure Treatment

| Peel strength (ppi) | Borosilicate glass |
|---|---|
| Formulation 1 | C.F. |
| Formulation 5 | C.F. |

On borosilicate glass, both Formulation 1 and 5 exhibit excellent peel strength with cohesive failure prior to post-cure treatment and after post-cure treatment. Cohesive failure occurs when the adhesion force is greater than the strength of the silicone rubber. Typically, the peel strength is greater than 20 ppi when cohesive failure occurs.

EXAMPLE 5

The adhesion properties of Formulations 1 and 5 on metal are evaluated. The metal substrates include the following: steel, stainless steel, aluminum, copper, and titanium. Self-bonding LSR films having a thickness of about 1.0 mm to about 1.5 mm are compression molded onto the substrates and the molding conditions are identical to physical test slabs described in Example 1. The peel test results are summarized in Tables 10 and 11. Table 10 illustrates the peel strength prior to treatment, and Table 11 includes peel strength after post cure at 177° C. for 4 hours. Comparison data for Wacker 3003/50 on selected substrates is also included.

TABLE 10

Peel Strength Prior to Treatment

| Peel strength (ppi) | Steel | Stainless steel | aluminum | copper | titanium |
|---|---|---|---|---|---|
| 3003/50 | 0.4 | 0.2 | 0.4 | 0.2 | 0.1 |
| Formulation 1 | 59.8 | 56.7 | 20.9 | 19.7 | 31.3 |
| Formulation 5 | 61.2 | 63.8 | 21.0 | 23.4 | 29.7 |

TABLE 11

Peel Strength after Post-Cure Treatment

| Peel strength (ppi) | Steel | Stainless steel | aluminum | copper | titanium |
|---|---|---|---|---|---|
| 3003/50 | 0.7 | 0.4 | 0.7 | 0.9 | 0.6 |
| Formulation 1 | 79.2 | 74.8 | 58.3 | 39.8 | 47.9 |
| Formulation 5 | 82.6 | 72.7 | 65.2 | 42.5 | 52.4 |

On metal substrates, both Formulation 1 and 5 exhibit excellent peel strength with greater peel strength compared to conventional Wacker 3003/50 prior to post-cure treatment and after post-cure treatment. Cohesive failure is observed. Hence, the adhesion force is greater than the strength of the silicone rubber. The peel strength is typically greater than 20 ppi when cohesive failure occurs.

EXAMPLE 6

The adhesion properties of Formulations 1 and 5 on sodium naphthalene etched PTFE are evaluated. Self-bonding LSR films having a thickness of about 1.8 mm is compression molded onto the substrates and the molding conditions are identical to physical test slabs described in Example 1. The peel test results are summarized in Tables 12 and 13. Table 12 illustrates the peel strength prior to treatment, and Table 13 includes peel strength after post cure at 177° C. for 4 hours. Comparison data for base rubber Wacker 3003/50 substrates is also included in the same table.

TABLE 12

Peel Strength Prior to Treatment

| Peel strength (ppi) | Na Naphth etched PTFE |
|---|---|
| Formulation 1 | 21.9 |
| Formulation 5 | 24.6 |
| 3003/50 | 1.7 |

TABLE 13

Peel Strength after Post-Cure Treatment

| Peel strength (ppi) | Na Naphth etched PTFE |
|---|---|
| Formulation 1 | 40.8 |
| Formulation 5 | 43.2 |
| 3003/50 | 3.8 |

On sodium naphthalene etched PTFE, both Formulation 1 and 5 exhibit excellent peel strength with greater peel strength and cohesive failure compared to conventional Wacker 3003/50 prior to post-cure treatment and after post-cure treatment. Cohesive failure occurs when the adhesion force is greater than the strength of the silicone rubber. Typically, the peel strength is greater than 20 ppi when cohesive failure occurs.

EXAMPLE 7

This example illustrates the use of self-bonding LSR as coating onto a range of substrate materials. The metal substrates include the following: fiberglass mat, colloidal silica (Ludox®) treated PTFE and stainless steel. A 0.2 mm thin film of Formulation 1 was coated onto the substrate using a slab mold. Vulcanization occurs in the slab mold at 177° C. for 0.5 minutes and the specimens are further post-cure for 4 hours at 177° C. The adhesion properties of the silicone film on these substrates are measured by the 180° C. peel test as described above and the results are summarized in Table 14.

TABLE 14

Peel Strength after Post-Cure Treatment

| Peel strength (ppi) | Fiberglass mat | Ludox silica treated PTFE | Stainless steel |
|---|---|---|---|
| Formulation 1 | 22.8 | 23.8 | 25.0 |

TABLE 14-continued

Peel Strength after Post-Cure Treatment

| Peel strength (ppi) | Fiberglass mat | Ludox silica treated PTFE | Stainless steel |
|---|---|---|---|

On all three substrates, Formulation 1 has excellent peel strength.

EXAMPLE 8

Self-bonding LSR can also be used as an adhesive to bond a fully cured silicone rubber slab onto a given substrate. A 0.2 mm tie layer of self-bonding LSR is molded between the silicone rubber slab and the substrate. The substrates are stainless steel and GE Lexan polycarbonate. Vulcanization occurs in the slab mold at 177° C. for 0.5 minutes. Adhesion properties of Formulation 1 are evaluated and the results are summarized in Table 15. The silicone rubber slab used in the test is made from Wacker 4105/40 (HCR).

TABLE 15

Peel Strength after Post-Cure Treatment

| Peel strength (ppi) | Stainless steel | Lexan |
|---|---|---|
| Formulation 1 | 10.7 | 47.7 |

Formulation 1 as a tie layer shows good peel strength on both substrates.

EXAMPLE 9

Three formulations are prepared for a performance study. Specifically, two vinyl-containing silsesquioxanes are added to two commercial HCR formulations. The vinyl-containing silsesquioxanes are commercially available from Gelest. Technical data of the vinyl-containing silsesquioxanes is illustrated in Table 16. The silicon HCRs are Wacker product R4000/50 for molding applications, and R4105/40 for extrusion applications. Formulation data is illustrated in Table 17. The low viscosity vinyl-containing silsesquioxanes are incorporated into the HCRs during the two part mixing step, using a roll mill. The additive loading level was between 0.5 to 2% by weight of HCR (phr, part per hundred part of rubber).

TABLE 16

Properties of Silsesquioxane in-situ adhesion promoter

| | Alkoxy group | Density (g/cm$^3$) | Viscosity (cSt) |
|---|---|---|---|
| VEE-005 | Ethoxy | 1.02 | 4-7 |
| VPE-005 | Ethoxy | 1.02 | 3-7 |

TABLE 17

Example Formulations

| | Matrix | Additive | % of additive (phr) |
|---|---|---|---|
| Formulation 6 | Wacker R4000/50 | VEE-005 | 0.75 |
| Formulation 7 | Wacker R4105/40 | VEE-005 | 0.75 |

TABLE 17-continued

Example Formulations

| | Matrix | Additive | % of additive (phr) |
|---|---|---|---|
| Formulation 8 | Wacker R4105/40 | VPE-005 | 1.5 |

The mechanical properties of the three formulations are evaluated. The test slabs are compression molded at 177° C. for 5 minutes and post-cured at 177° C. for 4 hours. Tensile properties, such as tensile strength and elongation-at-break, are evaluated on an Instron using ASTM D-412. Tear tests are performed on an Instron according to ASTM D-624 and hardness measurements are carried out on a Shore A durometer, following the procedure of ASTM D-2240. Compression set measurements are carried out according to ASTM D-395. The results are summarized in Table 18.

TABLE 18

Properties of Silicone Formulations

| | Tensile strength (psi) | Elongation (%) | 200% modulus (psi) | Tear strength (ppi) | Durometer (shore A) |
|---|---|---|---|---|---|
| Formulation 6 | 1276 | 702 | 375 | 222 | 55 |
| Formulation 7 | 1288 | 675 | 280 | 144 | 48 |
| Formulation 8 | 1301 | 698 | 292 | 172 | 51 |

EXAMPLE 10

The adhesion properties of Formulations 6 and 7 on thermal plastic substrates are evaluated. The thermal plastic substrates include the following: a polycarbonate substrate (GE Lexan), a polyetheretherketone (PEEK) substrate, a polyester substrate, and a polyetherimide substrate (Ultem). Self-bonding HCR films having a thickness of about 0.5 mm to about 1.5 mm are compression molded onto the substrates and the molding conditions are identical to physical test slabs described in Example 9. A mylar film is also molded onto the back of the silicone rubber in the same step to prevent elongation during the peel test. The 180° C. peel test as described above is performed and results are summarized in Tables 19 and 20. Table 19 illustrates the peel strength prior to treatment, and Table 20 includes peel strength after post cure at 177° C. for 4 hours. Comparison data for base rubber Wacker R400/50 is also included.

TABLE 19

Peel Strength Prior to Treatment

| Peel strength (ppi) | Lexan | PEEK | Polyester | Ultem |
|---|---|---|---|---|
| Formulation 6 | 0.6 | 2.4 | 0.8 | / |
| Formulation 7 | 4.4 | 2.6 | 1.8 | 3.3 |
| Formulation 8 | / | / | 2.2 | / |
| R4000/50 | 0.3 | 0.3 | 0.1 | 1.2 |

TABLE 20

Peel Strength after Post-Cure Treatment

| Peel strength (ppi) | Lexan | PEEK | Polyester | Ultem |
|---|---|---|---|---|
| Formulation 6 | 78.8 | 3.7 | 76.4 | / |
| Formulation 7 | 64.3 | 2.9 | 71.2 | 13.5 |
| Formulation 8 | / | / | C.F. | / |
| R4000/50 | 0.4 | 0.6 | 1.2 | 0.9 |

Before and after post-cure treatment, Formulations 6-8 bond with greater peel strength than Wacker R4000/50 on all four substrates. In particular, cohesive failure is observed in Formulations 6, 7, and 8 after post-cure on polyester. Further, Formulations 6 and 7 exhibit cohesive failure on Lexan after post-cure. Hence, the adhesion force is greater than the strength of the silicone rubber. Typically, the peel strength is greater than 20 ppi when cohesive failure occurs.

EXAMPLE 11

The adhesion properties of Formulations 6 and 7 on thermal set are evaluated. The thermal set substrates include the following: extrusion grade HCR rubber (Wacker 4105/40) and phenolic resin (Garolite). The peel test results are summarized in Tables 21 and 22. Table 21 illustrates the peel strength prior to treatment, and Table 22 includes peel strength after post cure at 177° C. for 4 hours.

TABLE 21

Peel Strength Prior to Treatment

| Peel strength (ppi) | HCR rubber | Phenolic resin |
|---|---|---|
| Formulation 6 | C.F. | C.F. |
| Formulation 7 | C.F. | C.F. |

TABLE 22

Peel Strength after Post-Cure Treatment

| Peel strength (ppi) | HCR rubber | Phenolic resin |
|---|---|---|
| Formulation 6 | C.F. | C.F. |
| Formulation 7 | C.F. | C.F. |

On HCR rubber and phenolic resin, both Formulation 6 and 7 exhibit excellent peel strength with cohesive failure prior to post-cure treatment and after post-cure treatment. Cohesive failure occurs when the adhesion force is greater than the strength of the silicone rubber. Typically, the peel strength is greater than 20 ppi when cohesive failure occurs.

EXAMPLE 12

The adhesion properties of Formulation 6 on glass are evaluated. The glass substrate is borosilicate. The peel test results are summarized in Tables 23 and 24. Table 23 illustrates the peel strength prior to treatment, and Table 24 includes peel strength after post cure at 177° C. for 4 hours.

TABLE 23

Peel Strength Prior to Treatment

| Peel strength (ppi) | Borosilicate glass |
|---|---|
| Formulation 6 | C.F. |

TABLE 24

Peel Strength after Post-Cure Treatment

| Peel strength (ppi) | Borosilicate glass |
|---|---|
| Formulation 6 | C.F. |

On borosilicate glass, both Formulation 6 exhibits excellent peel strength with cohesive failure prior to post-cure treatment and after post-cure treatment. Cohesive failure occurs when the adhesion force is greater than the strength of the silicone rubber. Typically, the peel strength is greater than 20 ppi when cohesive failure occurs.

EXAMPLE 13

The adhesion properties of Formulations 6 and 7 on metal are evaluated. The metal substrates include the following: steel, stainless steel, and aluminum. Self-bonding HCR films having a thickness of 1.0 mm to about 1.5 mm are compression molded onto the substrates and the molding conditions are identical to physical test slabs described in Example 9. The peel test results are summarized in Tables 25 and 26. Table 25 illustrates the peel strength prior to treatment, and Table 26 includes peel strength after post cure at 177° C. for 4 hours. Comparison data for Wacker R4000/50 on selected substrates is also included.

TABLE 25

Peel Strength Prior to Treatment

| Peel strength (ppi) | Steel | Stainless steel | aluminum |
|---|---|---|---|
| R4000/50 | 0.6 | 0.5 | 0.5 |
| Formulation 6 | 52.9 | 49.7 | 59.6 |
| Formulation 7 | 61.2 | 53.8 | 51.3 |

TABLE 26

Peel Strength after Post-Cure Treatment

| Peel strength (ppi) | Steel | Stainless steel | aluminum |
|---|---|---|---|
| R4000/50 | 1.2 | 0.5 | 0.9 |
| Formulation 6 | 63.8 | 58.6 | 67.8 |
| Formulation 7 | 69.2 | 62.2 | 71.4 |

On metal substrates, both Formulation 6 and 7 exhibit excellent peel strength with greater peel strength compared to Wacker R4000/50 prior to post-cure treatment and after post-cure treatment. Cohesive failure occurs before and after post-cure treatment for Formulations 6 and 7 on steel and aluminum. Cohesive failure occurs when the adhesion force is greater than the strength of the silicone rubber. Typically, the peel strength is greater than 20 ppi when cohesive failure occurs.

EXAMPLE 14

The adhesion properties of Formulations 6 and 7 on sodium naphthalene etched PTFE are evaluated. Self-bonding HCR films having a thickness of about 1.8 mm are compression molded onto the PTFE substrates and the molding conditions are identical to physical test slabs described in Example 9. The peel test results are summarized in Tables 27 and 28. Table 27 illustrates the peel strength prior to treatment, and Table 28 includes peel strength after post cure at 177° C. for 4 hours. Comparison data for base rubber Wacker 3003/50 substrates is also included in the same table.

TABLE 27

Peel Strength Prior to Treatment

| Peel strength (ppi) | Na Naphth etched PTFE |
|---|---|
| R4105/40 | 6.7 |
| Formulation 6 | 25.6 |
| Formulation 7 | 27.4 |

TABLE 28

Peel Strength after Post-Cure Treatment

| Peel strength (ppi) | Na Naphth etched PTFE |
|---|---|
| R4 105/40 | 2.7 |
| Formulation 6 | 46.4 |
| Formulation 7 | 49.1 |

On sodium naphthalene etched PTFE, both Formulations 6 and 7 exhibit excellent peel strength with greater peel strength and cohesive failure compared to Wacker 4105/40 prior to post-cure treatment and after post-cure treatment. Cohesive failure occurs when the adhesion force is greater than the strength of the silicone rubber. Typically, the peel strength is greater than 20 ppi when cohesive failure occurs.

EXAMPLE 15

This example illustrates the use of self-bonding HCR as a laminate onto a fiberglass mat. The adhesion property of Formulation 7 on the fiberglass mat is evaluated. A laminate with 1.0 mm thickness is molded onto the fiberglass mat using a slab mold. Vulcanization occurs in the slab mold at 177° C. for 0.5 minutes. A 20.6 ppi peel strength is measured on the post cured specimens (4 hr at 177° C.).

EXAMPLE 16

Self-bonding HCR can be used as a tie layer to bond different substrate materials together. Typical examples include PTFE/SB HCR/stainless steel and PTFE/SB HCR/aluminum. The self-bonding HCR (SB HCR) is Formulation 7. Typical thickness of the tie layer is about 0.2 mm. The laminate is formed by compression molding at 177° C. for 5 minutes. The peel strengths between the PTFE and metals are summarized in Tables 29 and 30. Table 29 is the peel strength prior to treatment. Table 30 is the peel strength after post cure at 177° C. for 4 hours.

TABLE 29

Peel Strength Prior to Treatment

| Peel strength (ppi) | PTFE/SB HCR/ stainless steel | PTFE/SB HCR/aluminum |
|---|---|---|
| Formulation 7 | CF | CF |

TABLE 30

Peel Strength after Post-Cure Treatment

| Peel strength (ppi) | PTFE/SB HCR/ stainless steel | PTFE/SB HCR/aluminum |
|---|---|---|
| Formulation 7 | CF | CF |

Cohesive failure is observed. Hence, the adhesion force is greater than the strength of the silicone rubber. The peel strength is typically greater than 20 ppi when cohesive failure occurs.

EXAMPLE 17

Six multi-layer tubes are used for a performance study. Specifically, various silicone formulations are tested as covers over a sodium-naphthalene etched heat-shrinkable PTFE liner (2:1 H/S ratio; obtained from Teleflex). The silicone rubber covers are obtained from Wacker (product 3003/50), GE (product LIMS 8040) and Shin Etsu (product 2090-40). Formulation 1 (Wacker 3003/50+Gelest VEE-005) and Formulation 5 (Wacker 3003/50+Gelest VPE-005) described above are also used as covers. Further, the first silicone tube is a tube made from Wacker product 3003/50 without a liner.

Life of the silicone rubber tubing is tested on either a standard pump head or Easy-Load II head at 600 rpm and zero backpressure.

Figure 3:
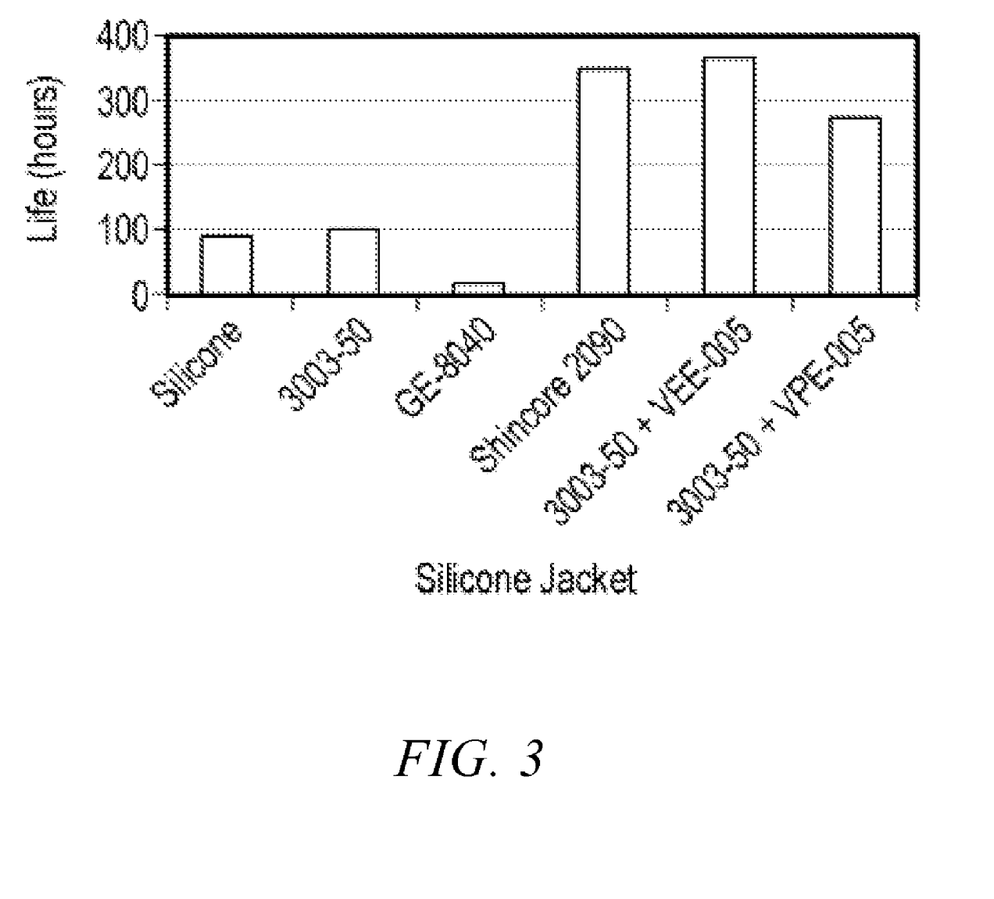
FIG. 3 includes graphical illustrations of data representing the performance of exemplary tubes.

FIG. 3 illustrates the affects of the three different liners on the life of silicone rubber tubing. Both the formulations containing the silsesquioxanes outperform the commercially available GE self-bonding LSR as well as the conventional LSRs. The multi-layer tube using Gelest VPE-005 has a life of greater than about 275 hours. The multi-layer tube using Gelest VEE-005 has a life of greater than about 350 hours and outperforms the commercially available Shin-Etsu self-bonding LSR.

EXAMPLE 18

This example illustrates the preparation of self-bonding silicone foam. 300 g of Momentive Sanitech 50 base is mixed with 3 g of Momentive CA6, 3 g of Azo Nobel Expancel and 2.25 g of VEE-005 by a two-roll mill. The mix is molded into 2.0 mm slabs at 350° F. for 2 minutes. The mix is also molded onto a stainless steel substrate, a polyester substrate, and an aluminum substrate under the same conditions. The slabs are post cured at 350° F. for 2 hr and the peel test results are summarized in Table 31.

TABLE 31

Peel strength for self-bonding silicone foam.

| Substrate | Peel Strength (ppi) |
|---|---|
| Aluminum | 29.4 |
| Polyester | 25.9 |
| Stainless Steel | 32.1 |

The density of the silicone foam is 0.52 g/cm³ and the thermal conductivity of the silicone foam is 0.16 W/mK. On all three substrates, the self-bonding silicone foam has excellent peel strength.

EXAMPLE 19

Five formulations are prepared for a performance study. Specifically, three in-situ adhesion promoters are added to a commercial LSR formulation. The adhesion promoters are dimethyl maleate (DMM), diethyl maleate (DEM) and dimethyl fumarate (DMF), which are all commercially available from Sigma Aldrich. The silicon LSR base rubber is Wacker Elastosil LR3003/50. Formulation data is illustrated in Table 31. The in-situ adhesion promoters are incorporated easily into the LSR during the two part mixing step, using a dough mixer; or a static mixer in the commercial LIMS mixing system. The additive loading level is between 0.3 to 1% by weight of LSR (phr, part per hundred part of rubber). Organosilsesquioxanes (Dynasylan 6498 and Dynasylan 6598, available from Degussa) are also used in two of the examples, to facilitate the dispersion of the adhesion promoter into the LSR matrix.

TABLE 31

Example Formulations

|  | Additive (phr) | Carrier (phr) |
|---|---|---|
| Formulation 9 | DMM (0.5) | / |
| Formulation 10 | DEM (0.7) | / |
| Formulation 11 | DMF (0.7) | / |
| Formulation 12 | DMM (0.35) | Dynasylan6498 (0.35) |
| Formulation 13 | DEM (0.5) | Dynasylan6598 (0.6) |

The mechanical properties of two formulations (Formulations 12 and 13) are evaluated. The test slabs are compression molded at 177° C. for 5 minutes and post-cured at 177° C. for 4 hours. Tensile properties, such as tensile strength and elongation-at-break, are evaluated on an Instron using ASTM D-412. Tear tests are performed on an Instron according to ASTM D-624 and hardness measurements are carried out on a Shore A durometer, following the procedure of ASTM D-2240. The results are summarized in Table 32.

TABLE 32

Properties of Silicone Formulations

|  | Tensile strength (psi) | Elongation (%) | 200% modulus (psi) | Tear strength (ppi) | Durometer (shore A) |
|---|---|---|---|---|---|
| Formulation 12 | 1384 | 756 | 311 | 229 | 42 |
| Formulation 13 | 1259 | 628 | 307 | 223 | 42 |

EXAMPLE 20

The adhesion properties of Formulations 9 to 13 on thermal plastic substrates are evaluated. The thermal plastic substrates include the following: a polycarbonate substrate (GE Lexan), a polyetheretherketone (PEEK) substrate, a polyester substrate, polyetherimide (Ultem), and polyphenylsulfone (Radel). Self-bonding films having a thickness of about 0.5 mm to about 1.5 mm are compression molded onto the substrates and the molding conditions are identical to physical test slabs described in Example 18. A mylar film is also molded onto the back of the silicone rubber in the same step to prevent elongation during the peel test. The peel test uses an Instron 4465 testing machine. Both the silicone layer and the substrate are clamped into the Instron grip. The grip then transverses in the vertical direction at the rate of two inches/minute, which pulls the silicone 180° away from the substrate. The 180° peel test results are summarized in Tables 33 and 34. Table 33 illustrates the peel strength prior to treatment, and Table 34 includes the peel strength after post cure at 177° C. for 4 hours. Comparison data for base rubber Wacker 3003/50 on selected substrates is also included.

TABLE 33

Peel Strength Prior to Treatment

| Peel strength (ppi) | Polycarbonate (Lexan) | PEEK | Polyester | Ultem | Radel |
|---|---|---|---|---|---|
| Formulation 9 | 22.4 | N/A | N/A | N/A | N/A |
| Formulation 10 | 17.8 | N/A | N/A | N/A | N/A |
| Formulation 11 | 20.9 | N/A | N/A | N/A | N/A |
| Formulation 12 | 14.0 | 5.0 | 9.3 | N/A | N/A |
| Formulation 13 | 24.1 | 23.7 | 15.4 | 21.9 | 26.0 |
| 3003/50 | 0.2 | 0.4 | 0.4 | 0.3 | 0.4 |

TABLE 34

Peel Strength after Post-Cure Treatment

| Peel strength (ppi) | Polycarbonate (Lexan) | PEEK | Polyester | Ultem | Radel |
|---|---|---|---|---|---|
| Formulation 9 | 53.4 | N/A | N/A | N/A | N/A |
| Formulation 10 | 49.7 | N/A | N/A | N/A | N/A |
| Formulation 11 | 38.7 | N/A | N/A | N/A | N/A |
| Formulation 12 | 64.9 | 28.9 | 66.4 | N/A | N/A |
| Formulation 13 | 57.3 | 55.6 | 57.0 | 63.5 | 51.9 |
| 3003/50 | 1.4 | 1.2 | 1.1 | 0.9 | 1.4 |

Before and after post-cure treatment, Formulations 9-13 bond with greater peel strength than Wacker 3003/50 on polycarbonate. In particular, cohesive failure is observed in Formulations 12 and 13 on the surface of polycarbonate, PEEK, Ultem, Radel, and polyester after post-cure treatment. Hence, the adhesion force is greater than the strength of the silicone rubber. Typically, the peel strength is greater than 20 ppi when cohesive failure occurs.

The adhesion properties of Formulations 12 and 13 on glass-filled nylon substrates are evaluated. Formulation 12 and 13 are injection molded onto freshly made substrate using a two-shot press. The thickness of the silicone rubber films is 4.0 mm and the geometry of the adhesion test specimen is defined by ASTM429. The adhesion test is carried by a 900 Peel according to ASTM429 and the results are summarized in Table 35. The post cure condition is 177° C. for 4 hours.

TABLE 35

Peel strength of two-shot molded silicone/Nylon parts.

| Peel strength (ppi) | Prior to Treatment | After Post-Cure Treatment |
|---|---|---|
| Formulation 12 | 37.4 | 41.8 |
| Formulation 13 | 21.6 | 49.2 |

EXAMPLE 21

The adhesion properties of Formulations 12 and 13 on metal are evaluated. The metal substrates include the following: copper, stainless steel, and aluminum. Self-bonding LSR films having a thickness of about 1.5 mm to about 1.8 mm are compression molded onto the substrates and the molding conditions are identical to physical test slabs described in Example 18. The peel test results are summarized in Tables 36 and 37. Table 36 illustrates the peel strength prior to treatment and Table 37 includes peel strength after post cure at 177° C. for 4 hours. Comparison data for Wacker 3003/50 on selected substrates is also included.

TABLE 36

Peel Strength Prior to Treatment

| Peel strength (ppi) | Stainless steel | Aluminum | Copper |
| --- | --- | --- | --- |
| 3003/50 | 0.2 | 0.4 | 0.1 |
| Formulation 12 | 20.9 | 18.3 | 21.4 |
| Formulation 13 | 23.4 | 22.5 | 24.7 |

TABLE 37

Peel Strength after Post-Cure Treatment

| Peel strength (ppi) | Stainless steel | Aluminum | Copper |
| --- | --- | --- | --- |
| 3003/50 | 0.4 | 0.7 | 0.6 |
| Formulation 12 | 23.2 | 71.6 | 54.8 |
| Formulation 13 | 58.4 | 60.1 | 49.2 |

On metal substrates, both Formulations 12 and 13 exhibit excellent peel strength with greater peel strength compared to conventional Wacker 3003/50 prior to post-cure treatment and after post-cure treatment. Cohesive failure is observed. Hence, the adhesion force is greater than the strength of the silicone rubber. The peel strength is typically greater than 20.0 ppi when cohesive failure occurs.

EXAMPLE 22

The adhesion properties of Formulations 12 and 13 on sodium naphthalene etched PTFE are evaluated. Self-bonding LSR films having a thickness of about 1.8 mm is compression molded onto the substrates and the molding conditions are identical to physical test slabs described in Example 18. The peel test results are summarized in Tables 38 and 39. Table 38 illustrates the peel strength prior to treatment and Table 39 includes peel strength after post cure at 177° C. for 4 hours. Comparison data for base rubber Wacker 3003/50 substrates is also included in the same table.

TABLE 38

Peel Strength Prior to Treatment

| Peel strength (ppi) | Na Naphth etched PTFE |
| --- | --- |
| Formulation 12 | 27.8 |
| Formulation 13 | 29.7 |
| 3003/50 | 1.7 |

TABLE 39

Peel Strength after Post-Cure Treatment

| Peel strength (ppi) | Na Naphth etched PTFE |
| --- | --- |
| Formulation 12 | 33.9 |
| Formulation 13 | 42.4 |
| 3003/50 | 3.8 |

On sodium naphthalene etched PTFE, both Formulations 12 and 13 exhibit excellent peel strength with greater peel strength and cohesive failure compared to conventional Wacker 3003/50 prior to post-cure treatment and after post-cure treatment. Cohesive failure occurs when the adhesion force is greater than the strength of the PTFE film. Typically, the peel strength is greater than 20.0 ppi when cohesive failure occurs.

EXAMPLE 23

Three formulations are prepared for a performance study. Specifically, diethyl maleate is added to one commercial platinum cured HCR formulation and two peroxide cured HCR formulations. Diethyl maleate is commercially available from Sigma Aldrich. The platinum cured silicon HCR is Momentive product, Santitech 65. The peroxide cured silicone HCRs are Bayer HV3 622 and Momentive SE6350. Formulation data is illustrated in Table 40. The low viscosity diethyl maleate is incorporated into the HCRs during the two part mixing step, using a two-roll mill. The additive loading level is between 0.5 to 1% by weight of HCR (phr, part per hundred part of rubber).

TABLE 40

Example Formulations

| | Base Rubber | Catalyst | % of additive (phr) |
| --- | --- | --- | --- |
| Formulation 14 | Momentive Santitech 65 | Platinum (Momentive CA6) | 0.70 |
| Formulation 15 | Bayer HV3 622 | Dichlorobenzonyl peroxide | 0.70 |
| Formulation 16 | Momentive SE 6350 | Dichlorobenzonyl peroxide | 0.83 |

The mechanical properties of the three formulations are evaluated and the results are summarized in Table 41. The test slabs are compression molded at 210° C. for 2 minutes and post-cured at 177° C. for 4 hours. Tensile properties, such as tensile strength and elongation-at-break, are evaluated on an Instron using ASTM D-412. Tear tests are performed on an Instron according to ASTM D-624 and hardness measurements are carried out on a Shore A durometer, following the procedure of ASTM D-2240.

TABLE 41

Properties of Silicone Formulations

| | Tensile strength (psi) | Elongation (%) | 200% modulus (psi) | Tear strength (ppi) | Durometer (shore A) |
| --- | --- | --- | --- | --- | --- |
| Formulation 14 | 1355 | 650 | 544 | 287 | 65 |
| Formulation 15 | 1533 | 731 | 235 | 220 | 53 |
| Formulation 16 | 1576 | 690 | 294 | 296 | 54 |

EXAMPLE 24

The adhesion properties of Formulations 14 on thermal plastic substrates are evaluated. The thermal plastic substrates include the following: a polycarbonate substrate (GE Lexan), a polyetheretherketone (PEEK) substrate, a polyetherimide (Ultem) substrate, a polyphenylsulfone (Radel) substrate, and a polyester substrate. Self-bonding HCR films having a thickness of about 0.5 mm to about 1.5 mm are compression molded onto the substrates and the molding conditions are identical to physical test slabs described in Example 22. A mylar film is also molded onto the back of the silicone rubber in the same step to prevent elongation during the peel test. The 180° peel test as described above is performed and results are summarized in Tables 42 and 43. Table 42 illustrates the peel strength prior to treatment, and Table 43 includes peel strength after post cure at 177° C. for 4 hours. Comparison data for conventional HCR Wacker R4000/50 is also included.

TABLE 42

| Peel Strength Prior to Treatment | | | | | |
|---|---|---|---|---|---|
| Peel strength (ppi) | Lexan | PEEK | Polyester | Ultem | Radel |
| Formulation 14 | 1.2 | 1.6 | 2.6 | 1.8 | 3.2 |
| R4000/50 | 0.3 | 0.3 | 0.1 | 0.2 | 0.4 |

TABLE 43

| Peel Strength after Post-Cure Treatment | | | | | |
|---|---|---|---|---|---|
| Peel strength (ppi) | Lexan | PEEK | Polyester | Ultem | Radel |
| Formulation 14 | 29.2 | 64.2 | 83.8 | 40.4 | 76.1 |
| R4000/50 | 0.4 | 0.6 | 1.2 | 0.8 | 0.9 |

Formulations 14 bond with greater peel strength than Wacker R4000/50 on all five substrates after post-cure treatment. In particular, cohesive failure is observed for all five substrates. Hence, the adhesion force is greater than the strength of the silicone rubber. Typically, the peel strength is greater than 20.0 ppi when cohesive failure occurs.

EXAMPLE 25

The adhesion properties of Formulations 14 and 15 on metal are evaluated. The metal substrates include stainless steel and aluminum. Self-bonding HCR films having a thickness of 1.0 mm to about 1.8 mm are compression molded onto the substrates and the molding conditions are identical to physical test slabs described in Example 22. The peel test results are summarized in Tables 44 and 45. Table 44 illustrates the peel strength prior to treatment and Table 45 includes peel strength after post cure at 177° C. for 4 hours. Comparison data for Wacker R4000/50 on selected substrates is also included.

TABLE 44

| Peel Strength Prior to Treatment | | |
|---|---|---|
| Peel strength (ppi) | Stainless steel | Aluminum |
| R4000/50 | 0.5 | 0.5 |

TABLE 44-continued

| Peel Strength Prior to Treatment | | |
|---|---|---|
| Peel strength (ppi) | Stainless steel | Aluminum |
| Formulation 14 | 45.0 | 36.8 |
| Formulation 15 | 6.9 | 15.6 |

TABLE 45

| Peel Strength after Post-Cure Treatment | | |
|---|---|---|
| Peel strength (ppi) | Stainless steel | Aluminum |
| R4000/50 | 0.5 | 0.9 |
| Formulation 14 | 74.8 | 54.3 |
| Formulation 15 | 15.4 | 30.6 |

On metal substrates, both Formulations 14 and 15 exhibit excellent peel strength with greater peel strength compared to Wacker R4000/50 prior to post-cure treatment and after post-cure treatment. Cohesive failure occurs before and after post-cure treatment for Formulations 14 and 15 on steel and aluminum. Cohesive failure occurs when the adhesion force is greater than the strength of the silicone rubber. Typically, the peel strength is greater than 20.0 ppi when cohesive failure occurs.

EXAMPLE 26

The adhesion properties of Formulations 14 to 16 on sodium naphthalene etched PTFE, sodium ammonium etched PTFE, and colloidal silica (Ludox®) treated PTFE are evaluated. Self-bonding HCR films having a thickness of about 1.8 mm are compression molded onto the etched PTFE substrates and the molding conditions are identical to physical test slabs described in Example 22. The peel test results are summarized in Tables 46 and 47. Table 46 illustrates the peel strength prior to treatment, and Table 47 includes peel strength after post cure at 177° C. for 4 hours. Comparison data for conventional HCR rubber Wacker 3003/50 substrates is also included in the same table.

TABLE 46

| Peel Strength Prior to Treatment | | | |
|---|---|---|---|
| Peel strength (ppi) | Na Naphth etched PTFE | Na NH$_3$ etched PTFE | Ludox ® treated PTFE |
| R4 105/40 | 6.7 | 1.7 | 2.1 |
| Formulation 14 | 20.5 | 29.2 | 10.0 |
| Formulation 15 | 23.5 | 28.9 | 9.3 |
| Formulation 16 | 22.9 | 27.6 | N/A |

TABLE 47

| Peel Strength after Post-Cure Treatment | | | |
|---|---|---|---|
| Peel strength (ppi) | Na Naphth etched PTFE | Na NH$_3$ etched PTFE | Ludox ® treated PTFE |
| R4 105/40 | 2.7 | 2.3 | 2.3 |
| Formulation 14 | 43.8 | 27.2 | N/A |
| Formulation 15 | 15.6 | 18.7 | N/A |
| Formulation 16 | 29.7 | 28.2 | N/A |

On sodium naphthalene etched PTFE, both Formulations 14 and 15 exhibit excellent peel strength with greater peel strength and cohesive failure compared to Wacker 4105/40 prior to post-cure treatment and after post-cure treatment. Both Formulations 14 and 15 give good peel strength on sodium ammonium etched PTFE and reasonable peel strength on Ludox® treated PTFE. Cohesive failure occurs when the adhesion force is greater than the strength of the PTFE film. Typically, the peel strength is greater than 20.0 ppi when cohesive failure occurs.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of making a silicone composition comprising:
mixing a silicone formulation in a mixing device; and
adding an in situ adhesion promoter to the mixing device, wherein the adhesion promoter is a silsesquioxane having a vinyl content of at least about 30.0% by weight.

2. The method of claim 1, further comprising the step of vulcanizing said silicone composition.

3. The method of claim 1, wherein the vinyl-containing silsesquioxane contains $RSiO_{3/2}$ units wherein R is an alkyl, an alkoxy, or a phenyl group, or any combination thereof.

4. The method of claim 1, wherein the in situ adhesion promoter is added in an amount of about 0.1 wt % to about 5.0 wt % of the total weight of the silicone formulation.

5. The method of claim 1, wherein the silicone formulation comprises at least one polyalkylsiloxane, a catalyst, and a filler.

6. The method of claim 1, wherein the silicone formulation is a silicone foam.

7. The method of claim 1, further comprising heating the silicone composition to a temperature of about 125° C. to about 200° C.

8. The method of claim 7, wherein heating includes heating for a time of about 5 minutes to about 10 hours.

9. An article comprising: a silicone formulation comprising a polyalkylsiloxane; an in situ adhesion promoter comprising a $C_{1-8}$ alkyl ester of maleic acid, fumaric acid, or any combination thereof; and a silsesquioxane, wherein the silsesquioxane has a vinyl content of at least about 30.0% by weight.

10. The article of claim 9, wherein the in situ adhesion promoter is diethyl maleate, dimethyl maleate, diethyl fumarate, dimethyl fumarate, or any combination thereof.

11. The article of claim 9, wherein the polyalkylsiloxane is liquid silicone rubber (LSR) or high consistency gum rubber (HCR).

12. An article comprising:
a silicone formulation comprising a polyalkylsiloxane; and
a vinyl-containing silsesquioxane containing $RSiO_{3/2}$ units wherein R is an alkyl group,
an alkoxy group, a phenyl group, or any combination thereof and wherein the silsesquioxane has a vinyl content of at least about 30.0% by weight.

13. The article of claim 12, wherein the polyalkylsiloxane is liquid silicone rubber (LSR) or a high consistency gum rubber (HCR).

14. The article of claim 13, wherein the high consistency rubber is silicone foam.

15. The method of claim 5, wherein the silicone formulation comprises a two part package wherein package (1) comprises
(a) a vinyl-containing polydialkylsiloxane;
(b) a catalyst; and
(c) a filler; and
wherein package (2) comprises
(d) a hydrogen-containing polydialkylsiloxane.

16. The method of claim 15, wherein the catalyst is a platinum catalyst, a peroxide catalyst, or combination thereof.

17. The article of claim 9, wherein the $C_{1-8}$ alkyl ester of maleic acid, fumaric acid, or any combination thereof is present in an amount of about 0.1 wt % to about 5.0 wt % of the total weight of the silicone formulation.

18. The article of claim 9, wherein the organosilsesquioxane is present in an amount of about 0.1 wt % to about 5.0 wt % of the total weight of the silicone formulation.

19. The article of claim 12, wherein the polyalkylsiloxane has a shore A durometer of less than about 75.

20. The article of claim 12, wherein the silsesquioxane is added in an amount of about 0.1 wt % to about 5.0 wt % of the total weight of the silicone formulation.

* * * * *